United States Patent [19]

Nomura

[11] Patent Number: 4,503,938
[45] Date of Patent: Mar. 12, 1985

[54] AC ELEVATOR CONTROL SYSTEM

[75] Inventor: Masami Nomura, Nagoya, Japan

[73] Assignee: Mitsubishi Denki Kabushiki Kaisha, Tokyo, Japan

[21] Appl. No.: 509,011

[22] Filed: Jun. 27, 1983

[30] Foreign Application Priority Data

Jul. 6, 1982 [JP] Japan ................... 57-117252

[51] Int. Cl.³ .............................................. B66B 1/06
[52] U.S. Cl. ..................................... 187/29 R; 363/49
[58] Field of Search .................. 187/29; 307/134, 135, 307/137, 151; 363/49, 69

[56] References Cited

U.S. PATENT DOCUMENTS 3,321,694  5/1967  Corey ..................................... 363/49
4,282,569  8/1981  Hardwick et al. ................. 363/49 X
4,441,584  4/1984  Mitsui et al. ........................... 187/29

FOREIGN PATENT DOCUMENTS 56-132275  10/1981  Japan .

Primary Examiner—B. Dobeck
Assistant Examiner—W. E. Duncanson, Jr.
Attorney, Agent, or Firm—Wenderoth, Lind & Ponack

[57] ABSTRACT

The disclosed AC elevator control system comprises a converter for converting a three-phase AC power applied to it through an electromagnetic switch closed for the start of an associated elevator car, to a direct current, and an inverter for inverting the direct current smoothed by a smoothing capacitor to a three-phase AC power with a variable voltage at a variable frequency which is supplied to a three-phase induction motor for controllably traveling the elevator car. A rectifier is connected across the smoothing capacitor through an impedance element to continuously apply a rectified voltage from the firstmentioned AC power to the capacitor and a voltage sensor relay connected across the capacitor senses the voltage on the latter and prevents the electromagnetic switch from being closed when the sensed voltage is low.

8 Claims, 13 Drawing Figures

FIG. 5.
PRIOR ART
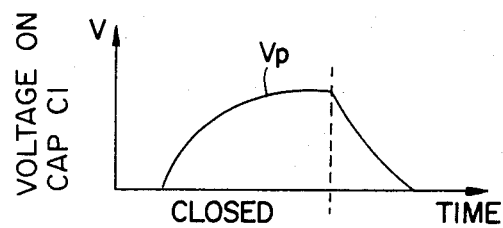
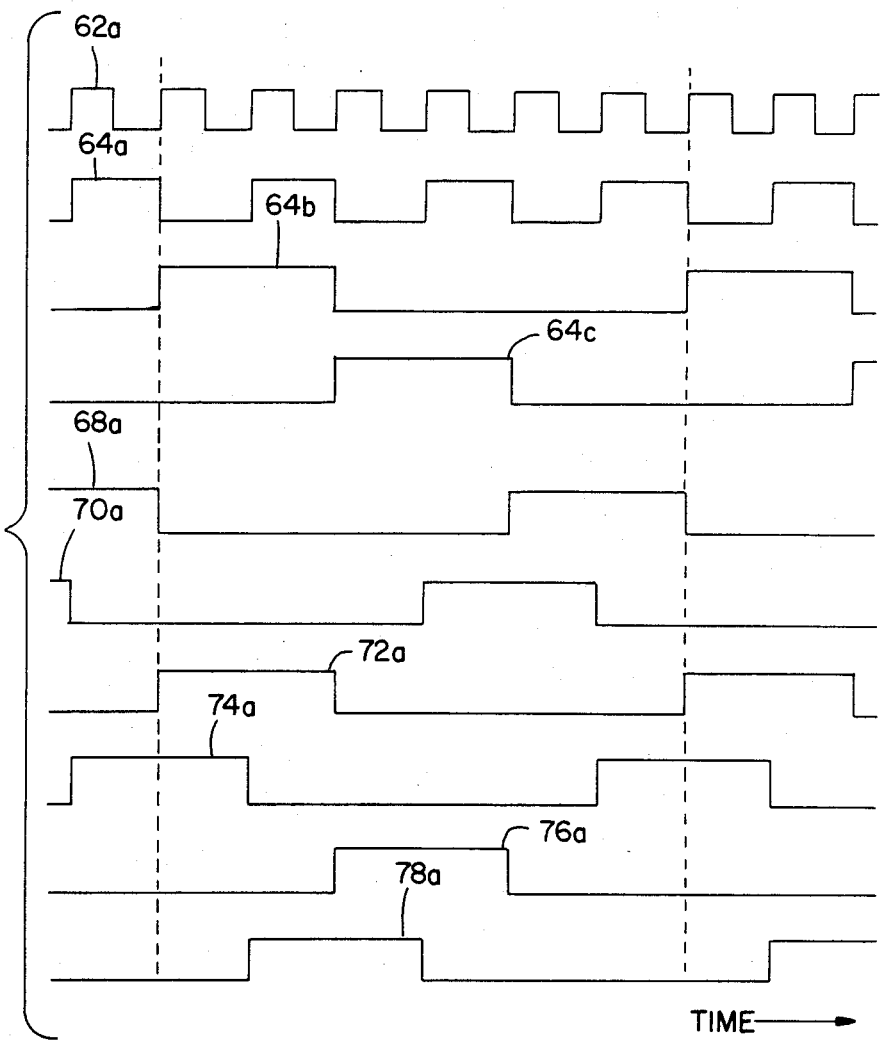
FIG. 6.
PRIOR ART

AC ELEVATOR CONTROL SYSTEM

BACKGROUND OF THE INVENTION

This invention relates to improvements in an AC elevator control system for controlling an elevator car driven by an AC motor.

There are known AC elevator control systems of the type including an elevator car driven by an induction motor which is supplied with an AC electric power with a variable voltage at a variable frequency to have a controlled speed of rotation thereof. One of such AC elevator control system has comprised a three-phase electromagnetic switch and a converter serially connected to one another in the named order. The converter has converted a three-phase AC electric power from the AC power to a direct current and the output thereof has been connected across a smoothing capacitor for smoothing the direct current from the converter and also to an inverter including a plurality of transistors connected across respective semiconductor diodes with the reversed polarity and arranged in a three-phase bridge configuration to invert the smoothed direct current from the smoothing capacitor to a three-phase AC electric power with a variable voltage at a variable frequency. The three-phase AC electric power from the inverter has been supplied to a three-phase induction motor for driving an associated elevator car with the speed of rotation thereof controlled. The inverter has varied in voltage and frequency of the three-phase AC power in response to a command firing signal applied thereto from an inverter control device receiving an actual and a command speed signal for the elevator car.

During the stoppage of the elevator car, the electromagnetic switch has been maintained open to disable the smoothing capacitor to charge. Thus an electric charge on the capacitor has discharged due to reverse leakage currents through elements disposed in the converter and inverter, a current through an associated resistor for monitoring an overvoltage, etc. With the elevator car stopped for a long time interval, a voltage across the capacitor has sharply reduced. At that time the issue of a command start signal for the elevator car has caused the electromagnetic switch to be closed to permit a high charging current to flow into the smoothing capacitor. This has resulted in the disadvantages that contact pairs of the electromagnetic switch are welded due to their temperature rises, the capacitor reduces in lifetime due to a rush current therethrough, an overcurrent flows through the converter to break it, the circuit breaker malfunctions and so on.

Accordingly, it is an object of the present invention to provide a new and improved AC elevator control system including means for preventing a high charging current from flowing into a smoothing capacitor involved upon the start of an associated elevator car.

SUMMARY OF THE INVENTION

The present invention provides an AC elevator control system comprising a converter for converting a commercial AC power from a commercial AC source to a direct current, a smoothing capacitor for smoothing the direct current from the converter, an inverter for inverting the smoothed current to an AC power at a variable frequency, and an AC motor receiving the AC power from the inverter to travel an elevator car, wherein there are provided contact pairs connected between commercial AC source and the converter to be closed upon the start of the elevator car, a rectifier connected between junctions of the commercial AC source and the contact pairs and the smoothing capacitor to rectify the AC power from the commercial AC source and supply a rectified voltage to the smoothing capacitor, and a voltage sensor device connected across the smoothing capacitor to sense a voltage thereacross and prevent the closure of the contact pairs for the start of the elevator car in response to the sensed voltage of not higher than a predetermined magnitude.

In a preferred embodiment of the present invention, the voltage sensor comprises a voltage sensing relay including a pair of normally open contacts connected in series circuit relationship with a pair of normally open contacts closed upon the start of the elevator car and a electromagnetic switch for controlling the contact pairs connected to the converter.

BRIEF DESCRIPTION OF THE DRAWINGS

The present invention will become more readily apparent from the following detailed description taken in conjunction with the accompanying drawings in which:

FIG. 5 is a graph illustrating an output from the command speed generator shown in FIGS. 1 and 4;

FIG. 6 is a graph illustrating waveforms developed at various points in the inverter control device shown in FIG. 4;

DESCRIPTION OF THE PREFERRED EMBODIMENTS

Figure 1:
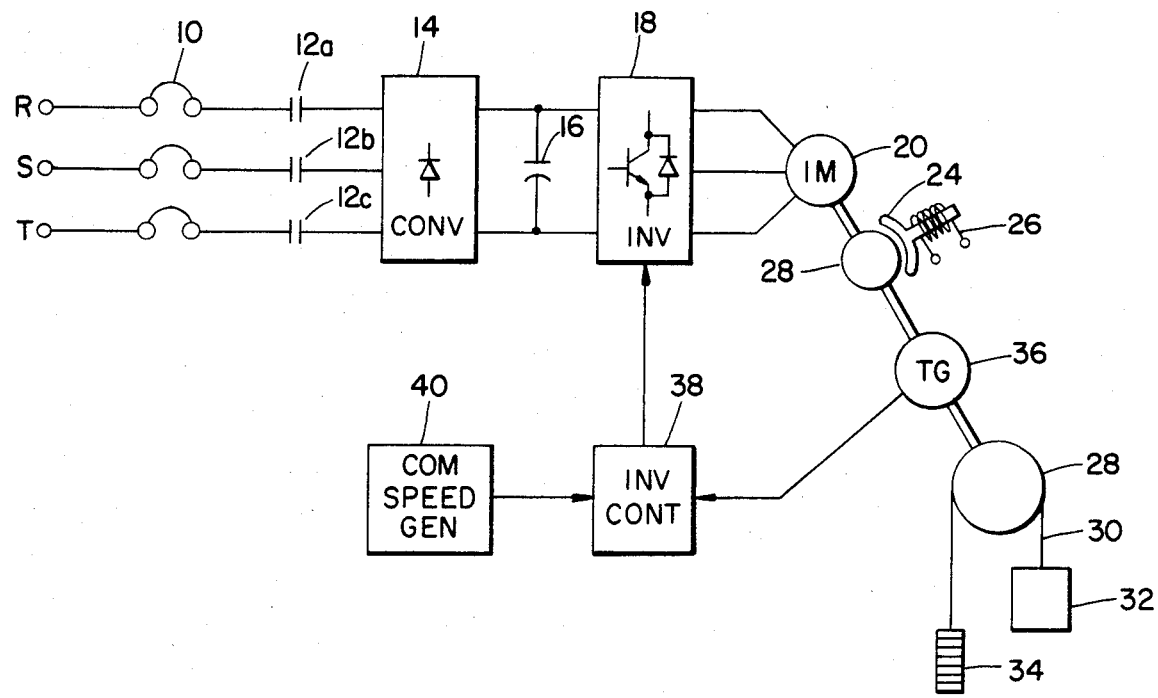
FIG. 1 is a combined circuit and block diagram of a conventional AC elevator control system.

Referring now to FIG. 1 of the drawings, there is illustrated a conventional AC elevator control system. The arrangement illustrated comprises a commercial AC source, for example, a three-phase AC source R-S-T, a three-phase circuit breaker 10, three contact pairs 12a, 12b and 12c arranged to be closed upon the start of an associated elevator car and opened upon the stoppage thereof, and the converter 14 formed of a plurality of semiconductor diodes to convert a three-phase AC power from the three-phase electric source R-S-T to a direct current. The converter 14 includes an output connected across a smoothing capacitor 16 and also connected to an inverter 18 well known in the art. The smoothing capacitor 16 is operative to smooth the direct current from the converter 14 and the inverter 18 is formed, for example, of six NPN transistors interconnected in a three-phase bridge configuration connected across the smoothing capacitor 16 with each transistor connected across one semiconductor diode with the reverse polarity as shown in block 18. The inverter 18 is operative to invert the smoothed direct current from the smoothing capacitor 16 to a three-phase AC power with a variable voltage at a variable frequency as will be described in more detail hereinafter. The inverter 18 supplies the three-phase AC power to an AC motor, in this case, a three-phase induction motor 20.

The induction motor 20 is mechanically coupled to a brake wheel 22 having an outer periphery opposite to a brake shoe 24 loaded with a spring (not shown). The brake shoe 24 is caused normally to push against the brake wheel 22 to apply a braking force to the latter by means of the action of the spring. The brake shoe 24 is also electromagnetically coupled to brake coil 26. When energized, the brake coil 26 is operative to move the brake shoe 24 away from the brake wheel 22 against the action of the spring.

The arrangement comprises further an elevator system encluding, in addition to the components 22, 24 and 26 as described above, a hoist shieve 28 driven by the three-phase induction motor 20, a traction rope 30 trained over the shieve 28, an elevator car 32 connected to one end of the traction rope 30 and a counter weight 34 connected to the other end of the traction rope 30.

As shown in FIG. 1, a tachometer generator 36 is directly connected to the induction motor 20 to sense a speed of rotation thereof and therefore the actual speed of the elevator car 32 to generate an actual speed signal for the elevator car 32. The tachometer generator 36 is connected to an inverter control device 38 to which a command speed generator 40 is connected. The inverter control device 38 receives the actual speed signal from the tachometer generator 36 and a command speed signal for the elevator car generated from the command speed generator 40 to supply a command firing signal to a base electrode of each of the NPN transistors to control the voltage and frequency of the three-phase AC power.

Figure 2:
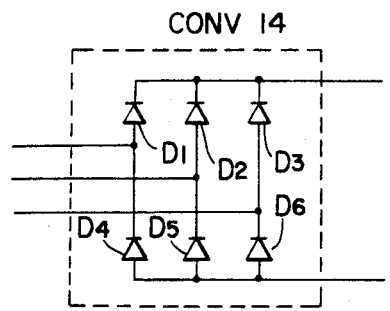
FIG. 2 is a circuit diagram of the converter shown in FIG. 1.

The converter 14 is, for example, of a circuit configuration as shown in FIG. 2. The arrangement illustrated is of the conventional construction and comprises six semiconductor diodes $D_1$, $D_2$, $D_3$, $D_4$, $D_5$ and $D_6$ interconnected into a three-phase full-wave rectifier including three branches each formed of one diode, for example, the diode $D_1$ connected at the anode electrode to the cathode electrode of the other diode such as the diode $D_4$, three-phase inputs formed of the junctions of the diodes in the three branches and a pair of DC outputs formed of the cathode electrodes of the diodes $D_1$, $D_2$ and $D_3$ connected together and the anode electrodes of the diodes $D_4$, $D_5$ and $D_6$ connected together respectively. The converter 14 converts a three-phase AC voltage applied to the junctions of the diodes to a corresponding DC voltage in the manner well known in the art. The DC voltage is developed across the DC outputs and then applied across the smoothing capacitor 16 and also to the inverter 18 as described above.

Figure 3:
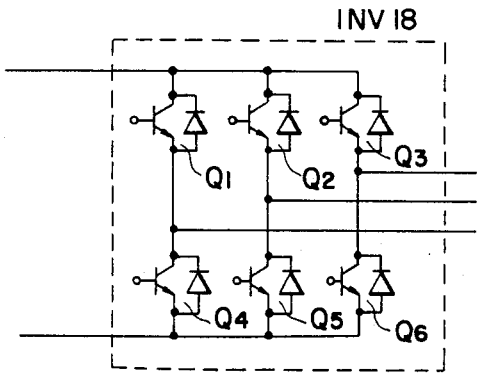
FIG. 3 is a circuit diagram of the inverter shown in FIG. 1.

The inverter 18 is of a circuit configuration such as shown in FIG. 3. The arrangement illustrated is also of the conventional construction and comprises SIX NPN transistors $Q_1$, $Q_2$, $Q_3$, $Q_4$, $Q_5$ and $Q_6$ interconnected so that each of the transistors $Q_1$, $Q_2$ or $Q_3$ is connected at the emitter electrode to a collector electrode of the transistor $Q_4$, $Q_5$ or $Q_6$ respectively and the collector and emitter electrodes of each transistor are connected across a semiconductor diode with the opposite polarity. The collector electrodes of the transistors $Q_1$, $Q_2$ and $Q_3$ are connected together to form one DC input and the emitter electrodes of the transistors $Q_4$, $Q_5$ and $Q_6$ are connected together to form the other DC input while the junctions of the serially connected transistors $Q_1$ and $Q_4$, $Q_2$ and $Q_5$ and $Q_3$ and $Q_6$ form three-phase outputs which is, in turn, connected to the three-phase induction motor 20.

By applying to the gate electrodes of the transistors a firing control signal as will be described later to successively control the conduction of the transistors, the inverter 18 inverts the DC voltage from the converter 14 applied across the DC inputs thereto to a corresponding three-phase AC power with a variable voltage at a variable frequency as described above.

Figure 4:
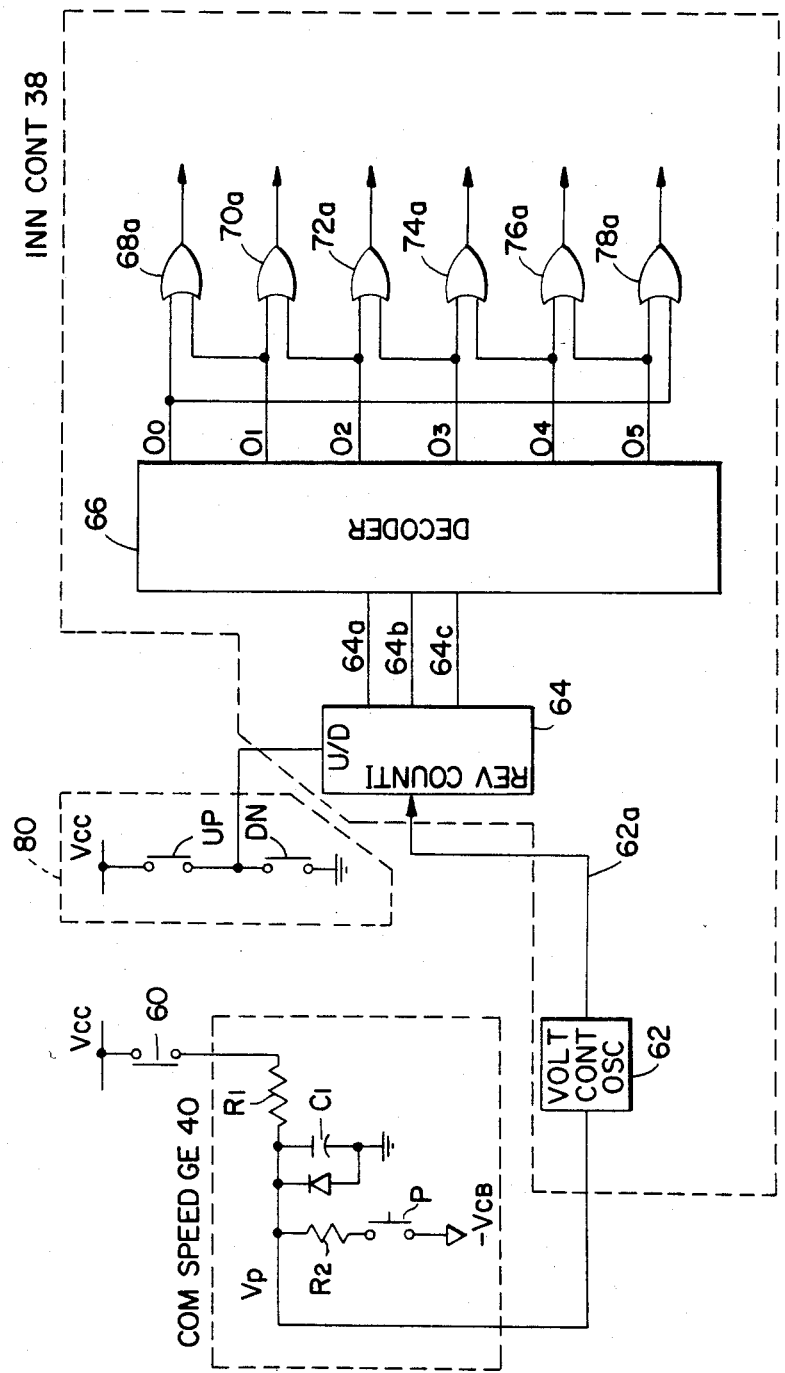
FIG. 4 is a circuit diagram of the inverter control device and command speed generator shown in FIG. 1.

FIG. 4 shows the details of the command speed generator and inverter control device 40 and 38 respectively. The command speed generator 40 illustrated comprises a charging resistor $R_1$ having one end forming an input thereto and connected at the other end to ground through a parallel combination of a capacitor $C_1$ and a semiconductor diode D including an anode electrode connected to ground. The resistor $R_1$ is also connected at the other end to a discharging resistor $R_2$ subsequently connected to a negative side -VCB of a DC source through a normally open switch P. The switch P is arranged to be closed in response to, for example, a command deceleration signal for the elevator car. Then the one end of the resistor $R_1$ or the input is connected to a positive side +VCC of the DC source through a call push-button 60 disposed on each floor of a building served by the elevator system as described above.

In FIG. 4 the inverter control device 38 comprises a voltage controlled oscillator 62 shown as being connected to the junction of the resistors $R_1$ and $R_2$ included in the command speed generator 40, a reversible counter 64 connected to the voltage oscillator 62, and a decoder 66 connected via three leads to the reversible counter 64. The decoder 66 includes six outputs $O_0$, $O_1$, $O_2$, $O_3$, $O_4$ and $O_5$ connected to six "OR" gates 68, 70, 72, 74, 76 and 78 in such a manner that, assuming that the lowermost output $O_5$ is followed by the uppermost output $O_0$, each pair of adjacent outputs are connected to a different one of those "OR" gates. For example, a pair of adjacent outputs $O_2$ and $O_3$ are connected to one and the other input to the "OR" gate 72.

When the call pushbutton 60 is closed, the positive voltage +VCC from the DC source charges the capacitor $C_1$ through the now closed pushbutton 60 and the resistor $R_1$ resulting in a charged voltage $V_P$ on the capacitor C, as shown in FIG. 5 wherein the axis of ordinates represents the charged voltage on the capacitor $C_1$ and the axis of abscissas represents time.

When the switch P is closed in response to a command deceleration signal, the voltage on the capacitor C, discharges to ground through the resistor $R_2$ and the now closed switch P to gradually decreases to a null magnitude.

Thus the voltage $V_p$ on the capacitor $C_1$ serves as a command speed signal.

After having been compared with the actual speed signal for the elevator car by a comparator (not shown in FIG. 4), the voltage $V_P$ is applied to the voltage controlled oscillator 62 which, in turn, generates a train of pulses 62a as shown at waveform 62a in FIG. 6. The pulses 62a are applied to the reversible counter 64 to be counted thereby in an up or a down direction as the case may be. The counter 64 generates three trains pulses 64a, 64b and 64c on the leads respectively. In this example, the counter 64 can count six pulses 62a and then clear. Thus the counter 64 repeatedly counts the six pulses 62a.

Those trains of pulses 64a, 64b and 64c are applied to the decoder 66 operative in accordance with a truth table listed in the following TABLE I.

TABLE I

Truth Table For Decoder 66

| INPUT | | | OUTPUT | | | | | |
|---|---|---|---|---|---|---|---|---|
| 64 a | 64 b | 64 c | $O_0$ | $O_1$ | $O_2$ | $O_3$ | $O_4$ | $O_5$ |
| 0 | 0 | 0 | 1 | 0 | 0 | 0 | 0 | 0 |
| 0 | 0 | 1 | 0 | 1 | 0 | 0 | 0 | 0 |
| 0 | 1 | 0 | 0 | 0 | 1 | 0 | 0 | 0 |
| 0 | 1 | 1 | 0 | 0 | 0 | 1 | 0 | 0 |
| 1 | 0 | 0 | 0 | 0 | 0 | 0 | 1 | 0 |
| 1 | 0 | 1 | 0 | 0 | 0 | 0 | 0 | 1 |

With the outputs 64a, 64b and 64c from the counter 64 shown at waveforms 64a, 64b and 64c in FIG. 6 respectively, the "OR" gates 68 through 78 receive the corresponding outputs $O_0$ through $O_5$ to produce respective outputs 68a, 70a, 72a, 74a, 76a and 78a shown at waveforms 68a, 70a, 72a, 74a, 76a and 78a in FIG. 6 respectively.

The outputs from the "OR" gates 68 through 78 are applied, as firing control signals, to gate electrodes of the associated transistors $Q_1$ through $Q_6$ included in the inverter 18 respectively to control the conduction of those transistors thereby to the induction motor 20 and therefore the elevator 32. For example, the outputs from the "OR" gates may be applied to the associated transistors in the manner as shown in FIG. 2 of U.S. Pat. No. 4,309,750. The pertinent portion of the cited patent is incorporated into the specification for reference.

In FIG. 4 a command travel direction generator 80 is also connected to the reversible counter 64. The generator 80 includes an up switch UP and a down switch DN serially connected across the positive side +VCC of the DC source and ground and the junction of the switches UP and DN connected to an U/D input to the reversible counter 62. When the up switch UP is closed in response to a command travel direction signal, a positive voltage from the DC source is applied to the reversible counter 64 to cause the latter to count the pulses from the voltage controlled oscillator 62 in an up direction to cause the inverter 18 to rotate the induction motor 20 so as to travel the elevator car 32 in the up direction. On the other hand, when the down switch DN is closed in response to a command travel direction signal, the ground voltage is applied to the reversible counter 64 to cause the latter to count the pulses 62a in a down direction resulting in the inverter 18 rotating the induction motor 20 to travel the elevator car in the down direction.

During the stoppage of the elevator car 32, the brake shoe 24 continues to push against the brake wheel 20 by means of the action of the spring (not shown) as described above. Upon the elevator car 32 receiving a command starting signal, the brake coil 26 is energized to move the brake shoe 24 away from the brake wheel 22. At the same time the contact pairs 12a, 12b and 12c of the electromagnetic switch are closed to permit the converter 14 to generate a DC output or the direct current which is, in turn, smoothed by the smoothing capacitor 16 and then applied to the inverter 18. The inverter 18 inverts the DC output to a three-phase AC power having a variable voltage and a variable frequency. That AC power is supplied to the induction motor 20 to start the latter. This results in the initiation of travel of the elevator car 32.

In these circumstances, the inverter control device 38 controls the inverter 18 to adjust the voltage and frequency of the three-phase AC power. Thus the speed of rotation of the induction motor 20 and therefore a travel speed of the elevator car 32 is automatically controlled with a high accuracy.

When the elevator car 32 approaches a floor of a building served thereby at which the elevator car 32 is predetermined to be stopped, the same is decelerated. At that time the contact pairs 12a, 12b and 12c of the electromangetic switch are opened to disconnect the converter 14 from the three-phase AC source R-S-T. Simultaneously the brake coil 26 is deenergized to cause the brake shoe 24 to push against the brake wheel 22 to apply the braking force to the latter as described above until the elevator car 32 is stopped at the abovementioned floor.

During the stoppage of the elevator car 32, the smoothing capacitor 14 is not charged because the contact pairs 12a, 12b and 12c are put in their open position. This means that an electric charge on the smoothing capacitor 14 is slowly discharged due to leakage currents flowing through elements included in both the converter 14 and the inverter 18 and a current flowing through an overvoltage monitoring resistor (not shown) etc. If the elevator car 32 continues to be stopped for a long time interval then a voltage across the smoothing capacitor 16 will be sharply reduced. Under these circumstances when a command starting signal is issued, the contact pairs 12a, 12b and 12c of the electromagnetic switch are closed to permit a high charging current to flow into the smoothing capacitor 16. This has resulted in the disadvantages as described above.

The present invention contemplates to eliminate the disadvantages of the prior art practice as described above by the provision of means for preventing the closure of the contact pairs of the electromanetic switch connected to the AC input of the converter in response to a low voltage across the smoothing capacitor.

Figure 7:
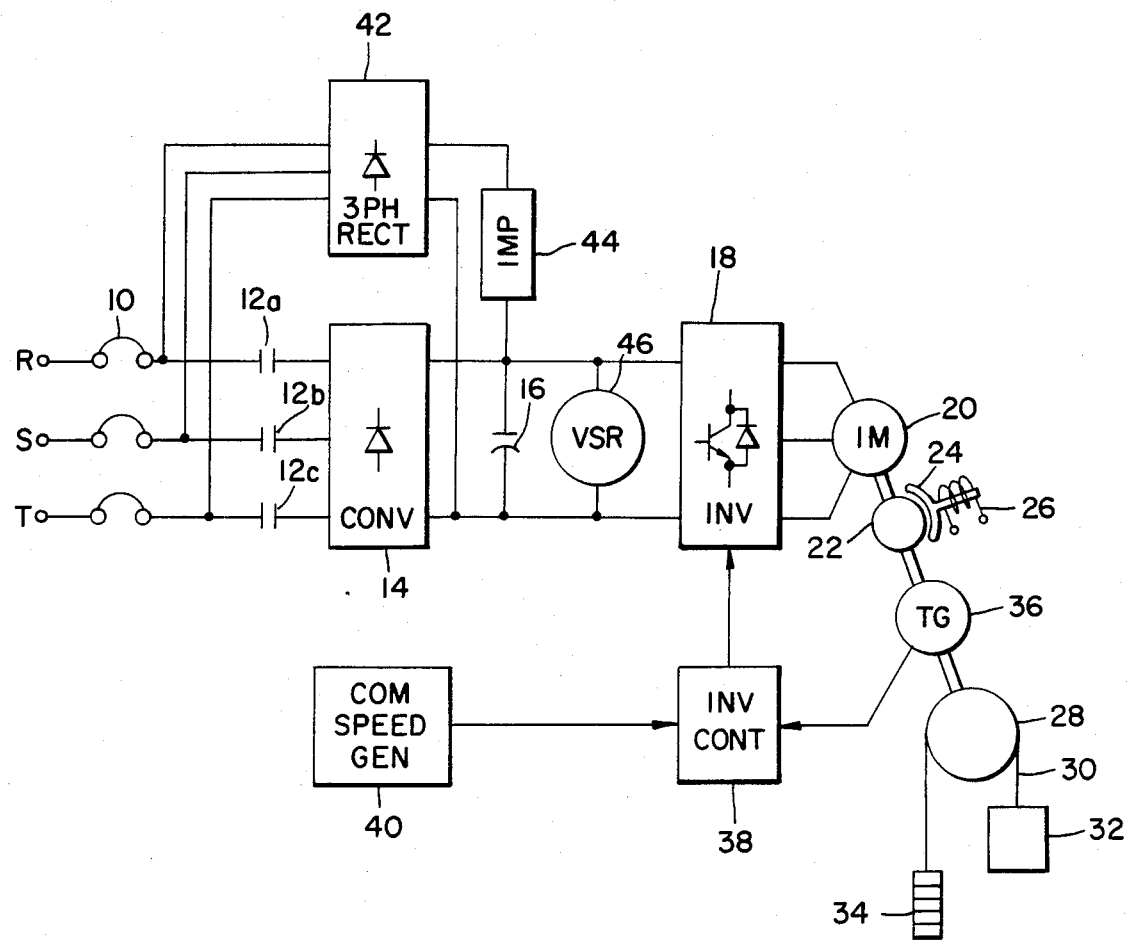
FIG. 7 is a combined circuit and block diagram of one embodiment according to the AC elevator control system of the present invention.

Referring now to FIG. 7 wherein like reference numerals designate the components identical to those shown in FIG. 1, there is illustrated one embodiment according to the AC elevator control system of the present invention. The arrangement illustrated is different from that shown in FIG. 1 only in that in FIG. 7 a three-phase rectifier 42 includes three AC inputs connected to the junctions of the contact pairs 12a, 12b and 12c of the electromagnetic switch and the circuit breaker 10 and a pair of DC output connected across the smoothing capacitor 16 through an impedance element 41 such as a resistor and also a voltage sensor relay 46 is connected across the smoothing capacitor 16. The three-phase rectifier 42 may be similar to the converter 14 and formed of a plurality of semiconductor diodes arranged in a three-phase bridge configuration to rectify the three-phase AC power from the AC source R-S-T into a direct current which is, in turn, supplied to the smoothing capacitor 16 through the impedance element 44. The voltage sensor relay 46 is responsive to an applied voltage in excess of a predetermined magnitude to be picked up and also responsive to an applied voltage less than the predetermined magnitude to be dropped out. Thus the voltage sensor relay 46 functions as a voltage sensor device.

Figure 8:
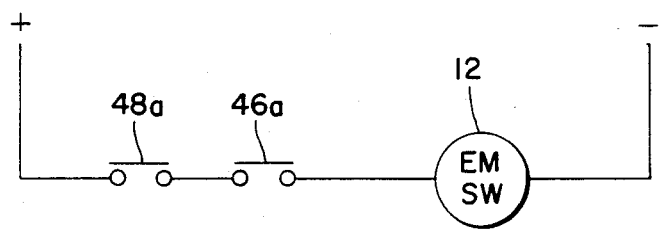
FIG. 8 is a circuit diagram of the essential portion of the arrangement shown in FIG. 7.

The voltage sensor relay 46 includes a pair of normally open contacts 46a having one contact connected to a negative terminal—of a DC source through the electromagnetic switch as described above designated by the reference numeral 12 and the other contact connected to the positive terminal + of the DC source through a pair of normally open contacts 48a of a command start relay (not shown) as shown in FIG. 8. The DC source is provided apart from the arrangement of FIG. 7. The command start relay is responsive to the issue of the command starting signal as described above to be picked up.

The operation of the arrangement shown in FIG. 7 will now be described. The smoothing capacitor 16 is charged by the rectifier 42 through the impedance element 44 during the stoppage of the elevator car 32. On the other hand, when the voltage across the smoothing capacitor 16 is sufficiently high, the voltage sensor relay 46 is picked up to close the pair of normally open contacts 46a. Thus when the command starting signal is issued, the command starting relay is picked up to close the pair of normally open contacts 48a. The closure of the pairs of normally open contacts 46a and 48a causes the electromagnetic switch 12 to close the contact pairs 12a, 12b and 12c. Thereafter the arrangement of FIG. 7 performs the operation as described above in conjunction with FIG. 1.

If the voltage across the smoothing capacitor 16 decreases for some reason to be equal to or less than the predetermined magnitude then the voltage sensor relay 46 is dropped out to maintain the pair of contacts 26a in the open position. Thus the issue of the command starting signal does not cause the electromagnetic switch 12 to be energized. Therefore the contact pairs 12a, 12b and 12c can not be closed. As a result, the elevator car 32 does not travel.

From the foregoing it is seen that the closure of the contact pairs 12a, 12b and 12c does not result in a rush current flowing into the smoothing capacitor 16 to charge the latter. This eliminates the disadvantages such as the welding of the contact pairs 12a, 12b and 12c of the electromagnetic switch, a decrease in lifetime of the smoothing capacitor 16, breakage of the converter 14 due to an overcurrent flowing therethrough etc. as described above.

Also with the voltage on the DC side or across the smoothing capacitor 16 decreased due to an increase in leakage current through the smoothing capacitor 16, abnormal increases in reverse leakage currents through the elements included in the inverter 18 or the converter 14, elements involved are, in many cases, deteriorated. Under these circumstances the travel of the elevator car 32 is automatically halted. Thus the arrangement of FIG. 7 is arranged to be capable of preventing any unexpected fault from occurring during the travel of the elevator car due to a failure of an element or elements involved. In other words, the elevator car is started after the electric power blocking function of the inverter 18 has been confirmed resulting in improvements in safety.

Furthermore the arrangement of FIG. 7 is free from the disadvantages due to the rush current flowing into the smoothing capacitor upon the installation or maintenance thereof. This is because when the circuit breaker 10 is closed to initiate the arrangement to be operated after the installation or maintenance thereof with the current breaker 10 open, the arrangment is not put in operation until the voltage across the smoothing capacitor 16 is sufficiently high after the closure of the current breaker 10.

Figure 9:
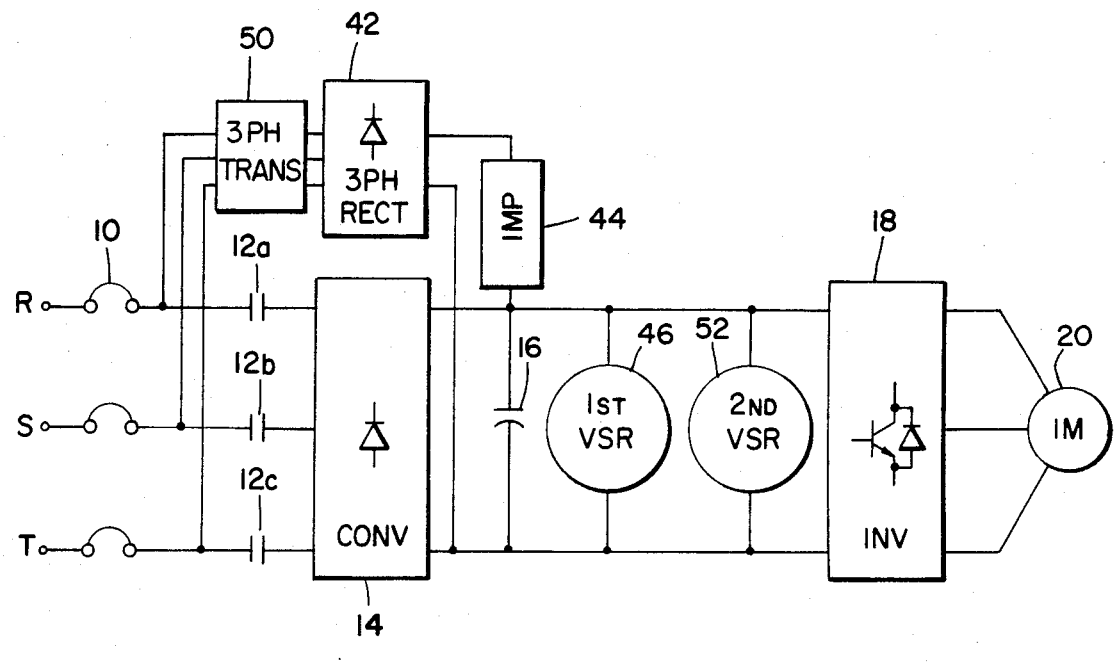
FIG. 9 is a diagram similar to FIG. 7 but illustrating a modification of the present invention with parts omitted.

FIG. 9 shows a modification of the present invention. The arrangement illustrated is different from that shown in FIG. 7 only in that in FIG. 9 a three-phase transformer 50 includes a primary winding (not shown) connected to the junctions of the circuit breaker 10 and the contact pairs 12a, 12b and 12c of the electromagnetic switch 12 and a secondary winding (not shown) connected to the AC input of the rectifier 42, and a second voltage sensor relay 52 is connected across the first voltage sensor relay 46 and therefore the smoothing capacitor 16. Thus like reference numerals have been employed to identify the components identical to those shown in FIG. 7 with the associated elevator system, the inverter control device 38 and the command speed generator 40 omitted only for purposes of illustration.

Figure 10:
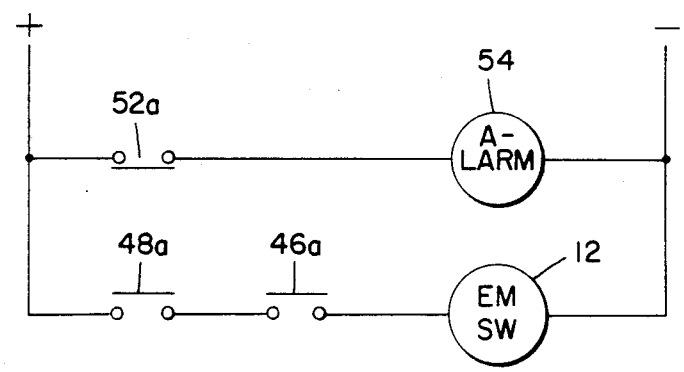
FIG. 10 is a circuit diagram similar to FIG. 8 but illustrating the arrangement shown in FIG. 9.

The second voltage sensor relay 52 is arranged to be dropped out with a second predetermined voltage higher than the predetermined voltage with and below which the first voltage sensor relay 35 is dropped out. As shown FIG. 10, the second voltage relay 52 includes a pair of normally closed contacts 52a serially connected to an alarm lamp 54 across the DC source and therefore the series combination of the pair of normally open contacts 48a, the pair of normally open contacts 46a and the electromagnetic switch 12 shown in FIG. 3. The alarm lamp 54 is disposed in an associated machine room (not shown).

The smoothing capacitor 16 is generally of the electrolytic type. When electrolytic capacitors are at the last state of their lifetime, associated dielectric materials increase in dielectric loss tangent. Thus the electrolytic capacitors increase in leakage current. This means that the DC voltage across the smoothing capacitor 16 or on the DC side of the converter 14 is somewhat decreased due to a voltage drop across the impedance element 44 serially connected to the smoothing capacitor 16 of the electrolytic type. It is not desirable, however, that the elevator car is halted to travel with such a voltage drop.

The purpose of the second voltage sensor relay 54 is to sense such a voltage drop. More specifically, the second voltage sensor relay 52 is picked up with a sufficiently high voltage across the smoothing capacitor 16 to open the pair of normally closed contacts 52a. Upon the occurrence of the voltage drop as described above, the second voltage sensor relay 52 is dropped out to close the pair of contacts 52a to fire the alarm lamp 54. Thus the maintenance operator learns the smoothing capacitor being at the last stage of its lifetime upon the periodical maintenance.

During the stoppage of the elevator car, the rectifier 42 supplies the DC voltage to the voltage sensor relays 46 and 54 through the impedance element 44. Thus that DC voltage is less than that supplied from the converter 14 with the contact pairs 12a, 12b and 12c closed. A difference between those DC voltages is compensated by the three-phase transformer 50.

In other respects, the arrangement of FIG. 9 is identical in operation to that shown in FIG. 7.

Figure 11:
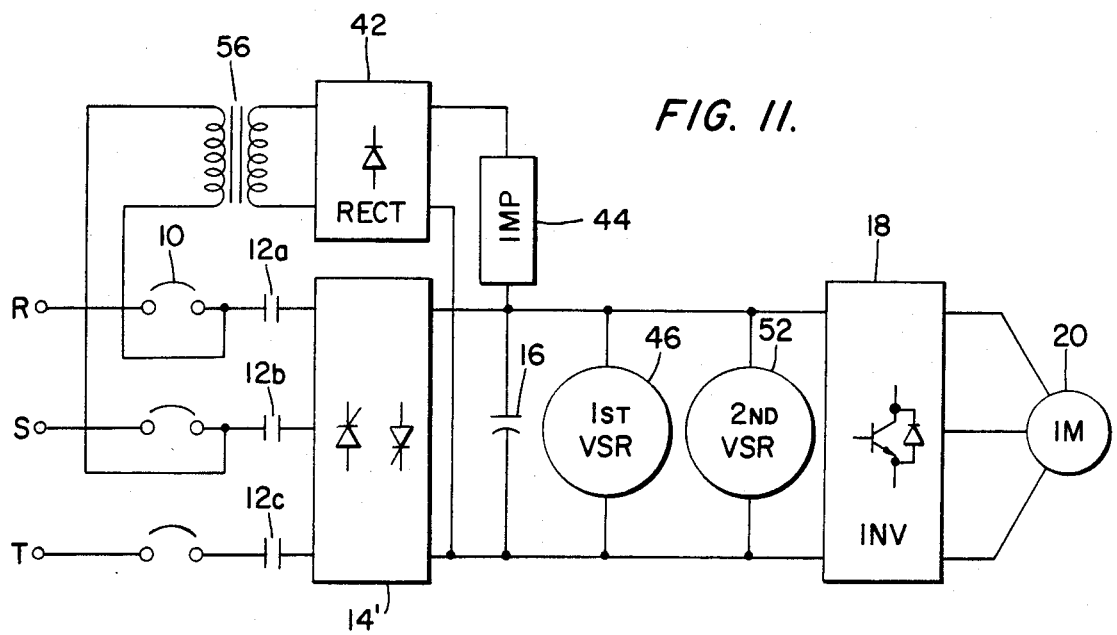
FIG. 11 is a diagram similar to FIG. 7 but illustrating another modification of the present invention with parts omitted.

In FIG. 11 wherein like reference on numerals designate the components identical to those shown in FIG. 9, there is illustrated another modification of the present invention. The arrangement illustrated is different from that shown in FIG. 9 only in that in FIG. 11, the converter 14 formed of the plurality of semiconductor diodes is replaced by a dual converter 14' formed of a plurality of thyristors and a single-phase transformer 56 is substituted for the three-phase transformer 50. The single-phase transformer 56 includes a primary winding connected across the junctions of the circuit breaker 10 and the contact pairs 12a, and 12b of the electromagnetic switch and a secondary connected to the AC input of the rectifier 42 modified accordingly.

Figure 12:
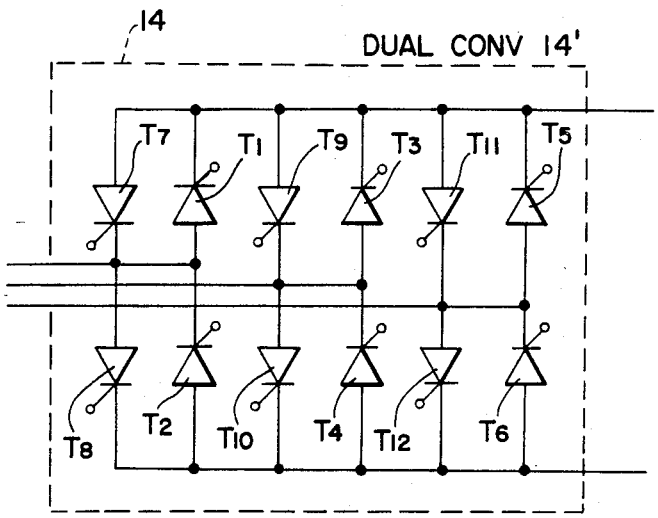
FIG. 12 is a circuit diagram of the dual converter shown in FIG. 11.

The dual converter 14 is of a well-known circuit configuration as shown in FIG. 12. The arrangement illustrated comprises three first parallel branches each including a thyristor $T_1$, $T_3$ or $T_5$ connected at the anode electrode to a cathode electrode of a thyristor $T_2$, $T_4$ or $T_6$ respectively, and three second parallel branches each including a thyristor $T_7$, $T_9$ or $T_{11}$ connected at the cathode electrode to an anode electrode of at thyristor $T_8$, $T_{10}$ or $T_{12}$ respectively. The second parallel branches alternate the first parallel branches. Three-phase AC conductors connected to the contact pairs 12a, 12b and 12c are connected to three pairs of the junctions of the thyristors $T_7$ and $T_8$, $T_9$ and $T_{10}$ and $T_{11}$ and $T_{12}$ and those of the adjacent thyristors $T_1$, and $T_2$, $T_3$ and $T_4$ and $T_5$ and $T_6$ respectively. The cathode electrode of the thyristors $T_0$, $T_1$, $T_2$ and $T_5$ and the anode electrodes of the thyristors $T_7$, $T_9$ and $T_{11}$ are connected together to one of two DC conductors while the anode electrodes of the thyristors $T_2$, $T_4$ and $T_6$ and the cathode electrodes of the thyristors $T_8$, $T_{10}$ and $T_{12}$ are connected together to the other DC conductor. The two DC conductors are connected across the smoothing capacitor 16, the sensor relays 46 and 52 to the inverter 18.

In the power running mode of operation the thyristors $T_1$ through $T_6$ are phase-controlled by a firing circuit (not shown) to convert a three-phase AC power developed on the three-phase AC conductors to a corresponding DC power which is produced across the DC conductors. In the regenerative mode of operation, however, the transistors $T_7$, through $T_{12}$ are phase-controlled by the firing circuit to be operated as a regenerative inverter for inverting a regenerated DC power developed across the DC conductors to a three-phase AC power which is produced on the three-phase conductors and returned back to the side of the three-phase AC source.

Figure 13:
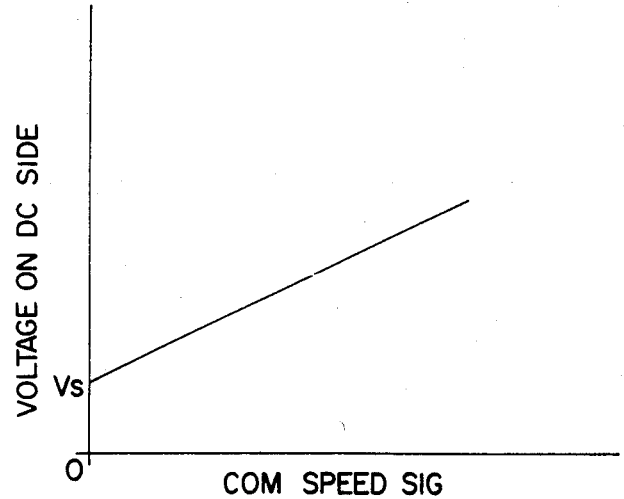
FIG. 13 is a graph illustrating the relationship between a voltage across the smoothing capacitor shown in FIG. 11 and a command speed signal obtained in the arrangement shown in FIG. 11.

The dual converter 14' is of the combined pulse-amplitude and pulse-width modulation type well known in the art to control a DC voltage therefrom. The dual converter 14' is applied with a command speed signal from the command speed generator 40 (not shown in FIG. 6) having the relationship between the same and the DC voltage across the smoothing capacitor 16 as shown in FIG. 13 wherein the axis of abscissas represents the command speed signal and the axis of ordinates represents the DC voltage across the smoothing capacitor. It is noted that the dual converter 14' is initially applied with a minimum $V_S$ of the command speed signal as shown in FIG. 13.

The dual converter 14' may be applied with a command frequency signal from the command frequency generator (not shown) having the relationship between the same and the DC voltage across the smoothing capacitor 16 similar to that shown in FIG. 7.

Accordingly, by initially charging the smoothing capacitor 16 to a DC voltage $V_S$ (see FIG. 13) from the rectifier 42 through the impedance element 44, no rush current flows into the smoothing capacitor 16 upon the closure of the contact pairs 12a, 12b and 12c of the electromagnetic switch and/or the firing of each thyristor disposed in the converter 14'.

If desired, the three-phase transformer 50 connected to the recrifier 42 as shown in FIG. 9 may be substituted for the single-phase transformer 56 connected to the rectifier 42.

In order to feed a regenerated DC power generated in the regenerative mode of operation of the induction motor back to the dual AC source R-S-T, the converter 14' has been of the reversible type.

From the foregoing it is seen that, the present invention provides an AC elevator control system comprising a converter for converting a commercial AC power to a direct current, a smoothing capacitor for smoothing the direct current, a inverter for inverting the smoothed direct current to an AC power with a variable voltage at a variable frequency and an induction motor receiving the AC power to drive an elevator car wherein there is provided means for sensing a voltage across the smoothing capacitor and preventing contact pairs connected to the AC input of the converter from being closed upon the start of the system. This measure is effective for preventing a high charging current from flowing into the smoothing capacitor upon the start of the system whereby the smoothing capacitor can be prevented from reducing in lifetime and the components involved can be prevented from breaking. Furthermore the current blocking ability of the inverter can be confirmed.

While the present invention has been illustrated and described in conjunction with a few preferred embodiments thereof it is to be understood that numerous changes and modifications may be resorted to without departing from the spirit and scope of the present invention.

What is claimed is:

1. An AC elevator control system comprising a converter for converting a commercial AC power from a commerical AC source to a direct current, a smoothing capacitor for smoothing said direct current from said converter, an inverter for inverting said smoothed current to an AC power at a variable frequency, and an AC motor receiving said AC power from said inverter to travel an elevator car wherein there are provided contact pairs connected between said commerical AC source and said converter to be closed for the start of said elevator car, means including a rectifier connected between junctions of said commerical AC source and said contact pairs and said smoothing capacitor to rectify said commerical AC power from said commerical AC source and supply a rectified voltage to said smoothing capacitor, and a voltage sensor device connected across said smoothing capacitor to sense a voltage thereacross and prevent the closure of said contact pairs for the start of said elevator car in response to the sensed voltage of not higher than a predetermined magnitude.

2. An AC elevator control system as claimed in claim 1 wherein said voltage sensor device comprises a voltage sensor relay picked up in response to an applied voltage in excess of said predetermined magnitude and dropped out in response to an applied voltage of not higher than said predetermined magnitude and including a pair of normally open contacts arranged to be normally open and closed during the pick-up thereof.

3. An AC elevator control system as claimed in claim 2 wherein said contact pairs closed upon said start of said elevator car are controlled by an electromagnetic switch connected across a DC source through said pair of normally open contacts of said voltage sensor relay and through a pair of contacts closed for said start of said elevator car.

4. An AC elevator control system as claimed in claim 1 wherein said voltage sensor device includes a first and a second voltage sensor relay connected across said smoothing capacitor, and said first voltage sensor relay functions to prevent said contact pairs from being closed upon said start of said elevator car while said second voltage sensor relay is dropped out with a voltage higher than a voltage with which said first voltage sensor relay is picked up and functions to sense the last stage of a lifetime of said smoothing capacitor due to an increase in leakage current therethrough.

5. An AC elevator control system as claimed in claim 4 wherein the drop-out of said second voltage sensor relay indicates the last state of a lifetime of said smoothing capacitor.

6. An AC elevator control system as claimed in claim 5 wherein said second voltage sensor relay includes a pair of normally open contacts open upon the drop-out thereof, said pair of normally open contacts being serially connected to means for indicating the last stage of a lifetime of said smoothing capacitor.

7. An AC elevator control system as claimed in claim 1 wherein said rectifier is connected to said commercial AC source through a transformer.

8. An AC elevator control system as claimed in claim 1 wherein said converter can control a DC output voltage therefrom to be variable, and said smoothing capacitor is initially charged to a minimum of a command voltage applied to said converter.

* * * * *